US008942691B2

(12) United States Patent
Owens et al.

(10) Patent No.: US 8,942,691 B2
(45) Date of Patent: Jan. 27, 2015

(54) AFTERMARKET TELEMATICS UNIT AND METHOD FOR DETECTING A TARGET MOUNTING ANGLE THEREOF

(75) Inventors: Kevin W. Owens, Sterling Heights, MI (US); Steven S. Sauerbrey, Farmington Hills, MI (US); Matt C. Videtich, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 360 days.

(21) Appl. No.: 13/289,796

(22) Filed: Nov. 4, 2011

(65) Prior Publication Data

US 2013/0115933 A1 May 9, 2013

(51) Int. Cl.
*B60R 25/00* (2013.01)
*H04M 1/725* (2006.01)
*B60R 25/33* (2013.01)

(52) U.S. Cl.
CPC ............... *B60R 25/00* (2013.01); *H04M 1/725* (2013.01); *H04M 1/72538* (2013.01); *B60R 25/33* (2013.01)
USPC .................. 455/418; 340/471; 701/1; 701/45

(58) Field of Classification Search
CPC .......... H04M 1/72538; B60R 21/0132; B60W 2520/125; B60G 2800/9124
USPC .................. 455/418; 340/425, 471; 701/45, 1
See application file for complete search history.

(56) References Cited

U.S. PATENT DOCUMENTS

| 2002/0120380 A1* | 8/2002 | Hambsch et al. ............... 701/45 |
| 2003/0023359 A1* | 1/2003 | Kueblbeck et al. ............. 701/45 |
| 2005/0275522 A1* | 12/2005 | Nitz et al. ..................... 340/471 |
| 2006/0097855 A1* | 5/2006 | Turnbull et al. ........... 340/425.5 |

OTHER PUBLICATIONS

Owens, Kevin W., et al., Telematics Unit and Method for Controlling Telematics Unit for a Vehicle, U.S. Appl. No. 12/845,822, filed Jul. 29, 2010.
Videtich, Matt C., et al., Vehicle Mirror and Telematics System, U.S. Appl. No. 12/851,025, filed Aug. 5, 2010.
Oesterling, Christopher L., et al., Aftermarket Telematics Unit for Use With a Vehicle, U.S. Appl. No. 12/845,848, filed Jul. 29, 2010.
Owens, Kevin W., et al., Aftermarket Telematics System, U.S. Appl. No. 12/895,066, filed Sep. 30, 2010.
Gratke, Jesse, Microphone Assembly for Use With an Aftermarket Telematics Unit, U.S. Appl. No. 12/830,928, filed Jul. 6, 2010.

* cited by examiner

*Primary Examiner* — Ajit Patel
*Assistant Examiner* — Michael Irace
(74) *Attorney, Agent, or Firm* — Ingrassia Fisher & Lorenz, P.C.

(57) ABSTRACT

An aftermarket telematics unit is disclosed herein. The aftermarket telematics unit includes, but is not limited to a housing that is configured to be mounted to an internal surface of a vehicle. The aftermarket telematics unit further includes an angle detection unit that is associated with the housing and that is configured to detect a mounting angle of the housing. The aftermarket telematics unit still further includes a processor that is associated with the housing. The processor is configured to perform an initial configuration procedure and is further configured to discontinue the initial configuration procedure when the mounting angle is out of a target range.

5 Claims, 5 Drawing Sheets

AFTERMARKET TELEMATICS UNIT AND METHOD FOR DETECTING A TARGET MOUNTING ANGLE THEREOF

TECHNICAL FIELD

The technical field generally relates to a vehicle, and more particularly relates to an aftermarket telematics unit that is compatible for use with a vehicle and a method for detecting a target mounting angle of the aftermarket telematics unit.

BACKGROUND

Telematics services are services that are provided by a call center to a vehicle and/or to the operator of a vehicle that relate to various needs of the vehicle or the operator. Telematics services commonly include, but are not limited to, the remote monitoring of vehicle maintenance needs, the provision of turn by turn navigation guidance, the provision of theft tracking services after a vehicle has been stolen, the provision of door unlock services when the vehicle's owner is locked out of the vehicle, and the coordination of emergency services after a vehicle collision or other emergency, to name just a few.

A telematics service system conventionally includes a telematics unit associated with the vehicle, a call center that is located remotely from the vehicle, and a communication network that communicatively connects the two. In a known example, the telematics unit is embedded in the vehicle (i.e., mounted to the vehicle during vehicle assembly) and directly connected to the vehicle bus. This connection to the vehicle bus permits the telematics unit to provide many of the telematics services. For example, an embedded telematics unit may be configured to determine when the vehicle has been involved in a collision by monitoring message traffic across the vehicle bus and detecting a message transmitted by the vehicle's air bag modules indicating that there has been an airbag deployment.

Aftermarket telematics units are also available in the market place. The term "aftermarket", when used in conjunction with the term "telematics unit" shall refer to a telematics unit that is not embedded in the vehicle (i.e., not mounted to the vehicle during vehicle assembly) but rather which is provided as a separate component from the vehicle by either an original equipment manufacturer or by another supplier after the vehicle has been assembled. Such aftermarket telematics units make it possible for drivers of vehicles that lack an embedded telematics unit to, nevertheless, receive some or all of the available telematics services. One service that such aftermarket telematics units are configured to provide is assistance to a driver and/or other occupants of the vehicle after a collision has occurred. However, because the aftermarket telematics unit is not an embedded telematics unit, it may not be communicatively coupled with the vehicle bus and may therefore be unable to receive message traffic sent by the vehicle's air bag module.

Accordingly, example aftermarket telematics units are equipped with independent collision detection units (e.g., gyroscopes; accelerometers, etc . . . ) that enable an aftermarket telematics unit to detect a collision. Some collision detection units may operate by detecting and/or measuring accelerations along various axes of the vehicle. When a significant acceleration is detected, the collision detection unit may be configured to conclude that a collision has occurred.

SUMMARY

Examples of an aftermarket telematics unit and a method for detecting a target mounting angle of an aftermarket telematics unit are disclosed herein.

In a first non-limiting example, the aftermarket telematics unit includes, but is not limited to, a housing that is configured to be mounted to an internal surface of a vehicle. The aftermarket telematics unit further includes an angle detection unit that is associated with the housing and that is configured to detect a mounting angle of the housing. The aftermarket telematics unit still further includes a processor that is associated with the housing. The processor is configured to perform an initial configuration procedure and is further configured to provide a signal when the mounting angle is out of target.

In another non-limiting example, the aftermarket telematics unit includes, but is not limited to, a housing that is configured to be mounted to an internal surface of a vehicle. The aftermarket telematics unit further includes an electronic storage unit associated with the housing. The aftermarket telematics unit further includes an angle detection unit that is communicatively coupled with the electronic storage unit. The angle detection unit is configured to detect a mounting angle of the housing and to instruct the electronic storage unit to store a first electronic data file containing information indicative of the mounting angle. The aftermarket telematics unit still further includes a processor that is communicatively coupled with the electronic storage unit. The electronic storage unit is configured to store a second electronic data file containing information relating to a plurality of target mounting angles. The processor is configured to perform an initial configuration procedure, to retrieve the first electronic data file and the second electronic data file stored in the electronic storage unit during the initial configuration procedure, to determine whether the mounting angle is within target using the first electronic data file and the second electronic data file, and to provide a signal when the mounting angle is out of target.

In another non-limiting example, the method includes, but is not limited to the step of detecting, with an angle detection unit of the aftermarket telematics unit, a mounting angle of the aftermarket telematics unit. The method further includes the step of commencing, with a processor, an initial configuration process to place the aftermarket telematics unit in a state of operational readiness. The method further includes the step of determining, with the processor, whether the mounting angle is within target. The method still further includes the step of producing a signal, with the processor responsive to the determination.

DESCRIPTION OF THE DRAWINGS

One or more examples will hereinafter be described in conjunction with the following drawing figures, wherein like numerals denote like elements.

DETAILED DESCRIPTION

Figure 1:
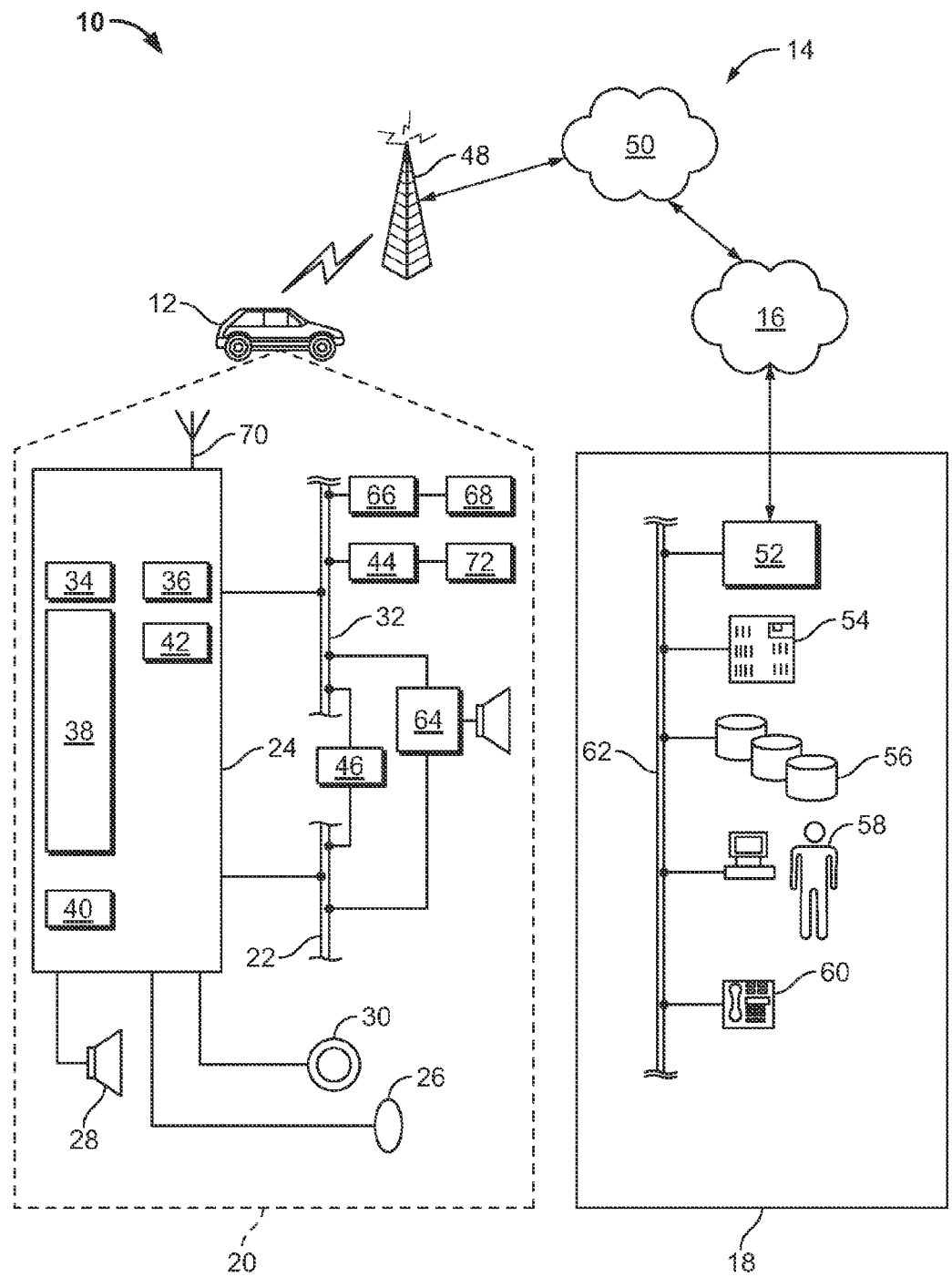
FIG. 1 is a schematic view illustrating a non-limiting example of a telematics service system that is compatible for use with examples of the aftermarket telematics unit and the method for detecting a mounting angle of the aftermarket telematics unit disclosed herein.

The following detailed description is merely exemplary in nature and is not intended to limit application and uses. Furthermore, there is no intention to be bound by any expressed or implied theory presented in the preceding technical field, background, brief summary or the following detailed description.

An aftermarket telematics unit and a method for detecting a mounting angle of an aftermarket telematics unit are disclosed herein. The aftermarket telematics unit may be equipped with an angle detection unit, such as, but not limited to, an accelerometer that is configured to detect a mounting angle of the aftermarket telematics unit. As used herein, the term "mounting angle" shall refer to the angle at which the aftermarket telematics unit is oriented when the aftermarket telematics unit is mounted to an internal surface of a vehicle. The mounting angle may refer to the angle at which the aftermarket telematics unit is oriented with respect to a horizontal surface, a lateral axis of the vehicle to which the aftermarket telematics unit is mounted, a longitudinal axis of the vehicle to which the aftermarket telematics unit is mounted, a vertical axis of the vehicle to which the aftermarket telematics unit is mounted, or to some other defined reference axis. The angle detection unit is further configured to communicate the mounting angle to another component of the aftermarket telematics unit such as, but not limited to, a processor and/or an electronic storage unit that is configured to store electronic data.

When the user initially installs the aftermarket telematics unit in his or her vehicle, the aftermarket telematics unit must execute a configuration procedure (i.e., it must execute a registration process that may include communicating with a remotely located call center) before a user can utilize any of the available telematics services. The processor of the aftermarket telematics unit orchestrates the configuration procedure. As part of the configuration procedure, the processor is configured to assess whether the mounting angle is within target (e.g., to determine whether the mounting angle falls within a range of target angles, to determine whether the mounting angle deviates from a single target mounting angle by less than a predetermined amount, etc . . . ). If the mounting angle is within target, the processor is configured provide a signal and, in some examples, to discontinue configuration, or to alert the user, the call center, or both about the target mounting angle. In some examples, after the configuration procedure has been discontinued, it cannot be resumed and the aftermarket telematics unit will be disabled from providing telematics services to the user.

A greater understanding of the examples of the aftermarket telematics units and the methods for detecting a mounting angle of an aftermarket telematics unit disclosed herein may be obtained through a review of the illustrations accompanying this application together with a review of the detailed description that follows.

With reference to FIG. 1, there is shown a non-limiting example of a communication system 10 that may be used together with examples of the aftermarket telematics unit disclosed herein or to implement examples of the methods for detecting a mounting angle of an aftermarket telematics unit disclosed herein. Communication system 10 generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the apparatus and the method disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, etc., and is equipped with suitable hardware and software that enables it to communicate over communication system 10. Some of the vehicle hardware 20 is shown generally in FIG. 1 including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within electronic processing device 38.

The telematics unit 24 may provide various services including: turn-by-turn directions and other navigation-related services provided in conjunction with the GPS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. In order to enable successful data transmission over the voice channel, wireless modem 36 applies some type of encoding or modulation to convert the digital data so that it can be communicated through a vocoder or speech codec incorporated in the cellular chipset/component 34. Any suitable encoding or modulation technique that provides an acceptable data rate and bit error can be used with the present examples. Dual mode antenna 70 services the GPS chipset/component 42 and the cellular chipset/component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of an audio component 64 of the vehicle. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Example vehicle sensors include but are not limited to gyroscopes, accelerometers, magnetometers, emission detection, and/or control sensors, and the like. Example sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14. For example, a base station and a cell tower could be co-located at the same site or they could be remotely located, and a single base station could be coupled to various cell towers or various base stations could be coupled with a single MSC, to list but a few of the possible arrangements. A speech codec or vocoder may be incorporated in one or more of the base stations, but depending on the particular architecture of the wireless network, it could be incorporated within a Mobile Switching Center or some other network components as well.

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a call center 18 that is manned, it will be appreciated that the call center 18 can be any central or remote facility, manned or unmanned, mobile or fixed, to or from which it is desirable to exchange voice and data.

Figure 2:
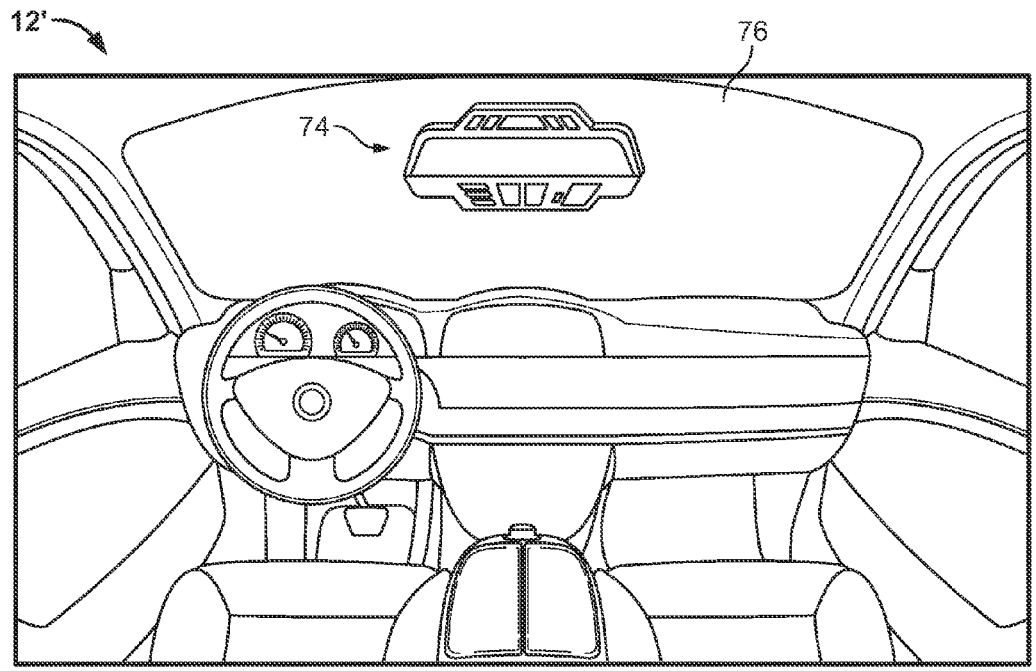
FIG. 2 is a perspective view illustrating an interior of a vehicle equipped with a non-limiting example of an aftermarket telematics unit of the present disclosure.

FIG. 2 is a perspective view illustrating an interior of a vehicle 12' equipped with a non-limiting example of an aftermarket telematics unit 74 configured as a rear view mirror and mounted to windshield 76. With continuing reference to FIG. 1, aftermarket telematics unit 74 may provide some or all of the functionality that is provided by telematics unit 24 of communication system 10, described above, and, in some examples, may be substituted for telematics unit 24 in a vehicle 12. Aftermarket telematics units such as aftermarket telematics unit 74 are well-known in the art. For example, aftermarket telematics units are disclosed in pending U.S. patent application Ser. No. 12/787,472 filed on May 26, 2010, and also in U.S. Publication No. 2005/0273211 published on Dec. 8, 2005, both of which are hereby incorporated herein by reference in their entirety.

Although vehicle 12' is illustrated as being a passenger sedan in FIG. 2, it should be understood that aftermarket telematics unit 74 and the methods disclosed herein for detecting a mounting angle of aftermarket telematics unit 74 are equally compatible with any other type of automobile. Furthermore, the teachings herein are not limited to use with automobiles but rather are equally applicable to any other type of vehicle including, but not limited to, aircraft and watercraft. Additionally, although aftermarket telematics unit 74 has been depicted as being a rear view mirror, it should be understood that this depiction is exemplary in nature and that aftermarket telematics unit 74 is not limited to configurations where it is implemented as a rear view mirror. Rather, aftermarket telematics unit 74 may be housed in any other type of housing that is configured for mounting to an internal surface of vehicle 12' without departing from the teachings of the present disclosure. Furthermore, while aftermarket telematics unit 74 has been illustrated as being mounted to windshield 76, it should be understood that aftermarket telematics unit 74 may be mounted to any suitable internal surface of vehicle 12' without departing from the teachings of the present disclosure.

Figure 3:
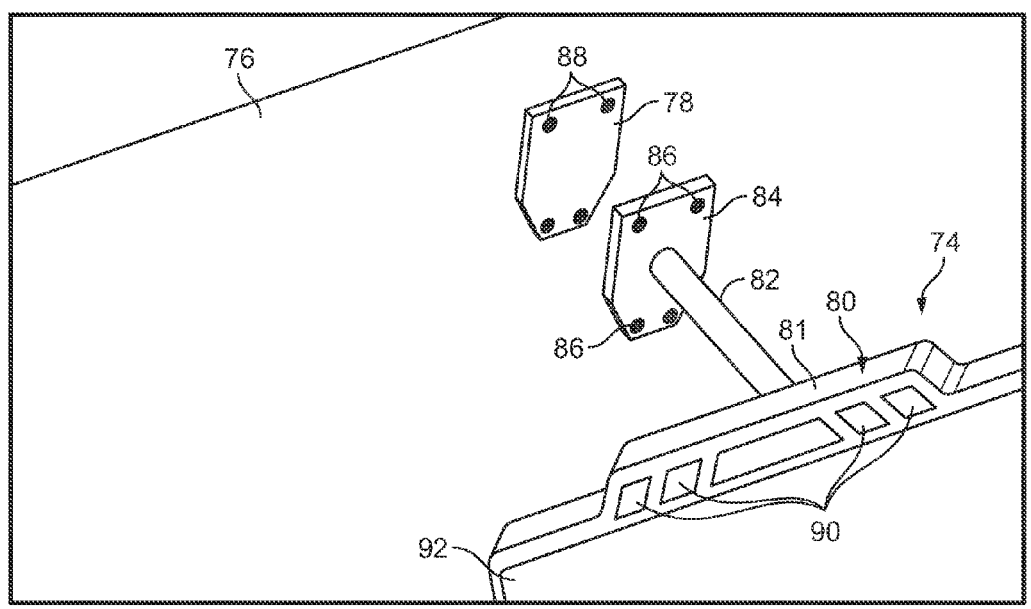
FIG. 3 is a perspective view illustrating an arrangement for mounting the aftermarket telematics unit of FIG. 2 to a windshield of a vehicle.

FIG. 3 is a perspective view illustrating an arrangement for mounting aftermarket telematics unit 74 to windshield 76. A button 78 is affixed to windshield 76 via an adhesive. Aftermarket telematics unit 74 includes a housing assembly 80. Housing assembly 80 includes a main portion 81 that is configured to house a mirror, a neck portion 82 that extends from main portion 81 towards windshield 76, and a base portion 84 that is configured to mount housing assembly 80 windshield 76. In some examples, neck portion 82 may be substantially hollow and may house various electrical components associated with aftermarket telematics unit 74.

Base portion 84 is configured to engage button 78. Base portion 84 includes threaded openings 86 which are positioned to coaxially align with threaded openings 88 on button 78 when base portion 84 is engaged with button 78. Such coaxial alignment permits the use of threaded fasteners to secure base portion 84 to button 78. When base portion 84 is engaged with button 78, base portion 84 supports aftermarket telematics unit 74 in an attached arrangement with respect to windshield 76. In other examples, base portion 84 and button 78 may be configured to engage with one another in any other suitable manner including, but not limited to, a snap-fit engagement.

Also depicted in FIG. 3 are various buttons 90 arranged at a periphery of a rearward facing portion of aftermarket telematics unit 74. Buttons 90 allow a user seated in the passenger compartment of vehicle 12' to actuate and utilize various functions provided by aftermarket telematics unit 74. A reflective surface 92 is also disposed on a rearward facing portion of aftermarket telematics unit 74 to permit a user to view an area to the rear of vehicle 12'.

Figure 4:
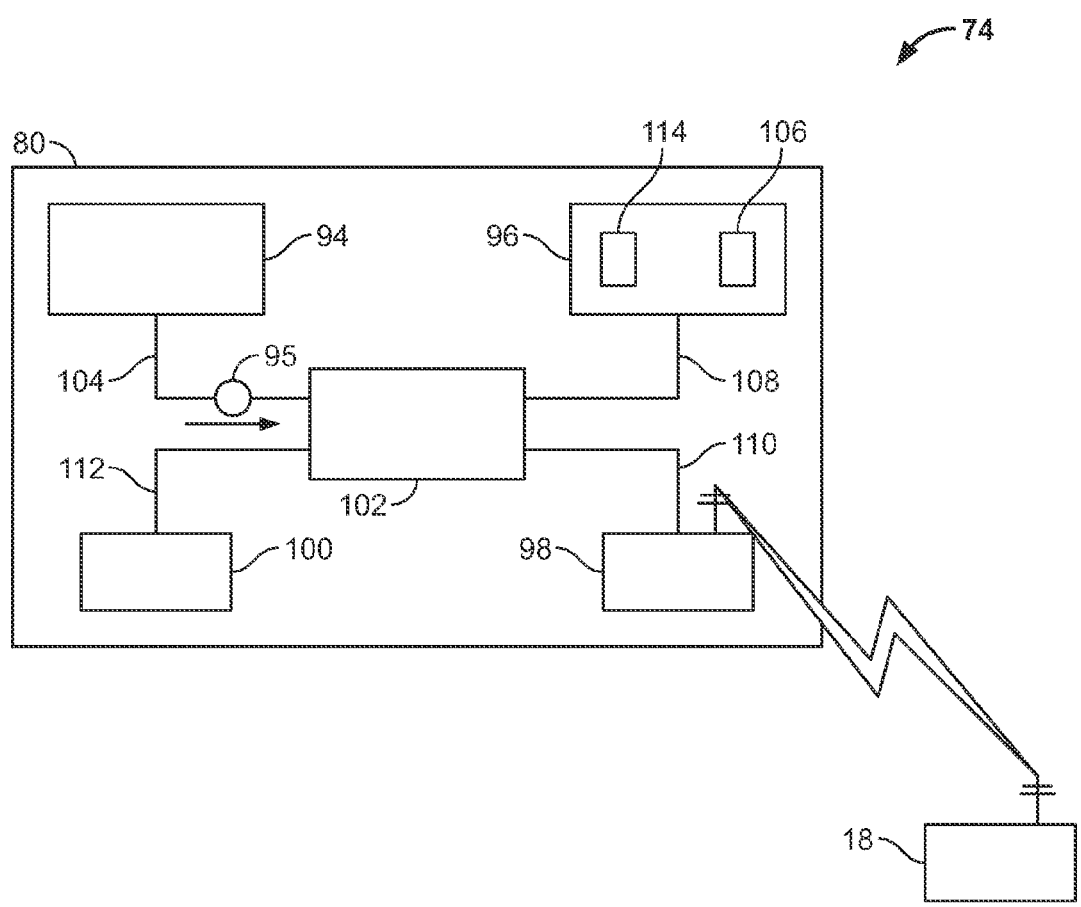
FIG. 4 is a schematic view illustrating a non-limiting example of the aftermarket telematics unit made in accordance with the present disclosure.

FIG. 4 is a schematic view illustrating an example of aftermarket telematics unit 74. With continuing reference to FIGS. 1-3, aftermarket telematics unit 74 includes housing assembly 80, an angle detection unit 94, an electronic storage unit 96, a wireless communication unit 98, and illuminating element 100 and a processor 102. In other examples, aftermarket telematics unit 74 may include a greater or lesser number of components.

As illustrated, angle detection unit 94, electronic storage unit 96, wireless communication unit 98, and illuminating element 100 are each coupled with processor 102. In some examples, such coupling may be a communicative coupling for the purposes of sending messages and inquiries between these components while in other examples, such coupling may be an operative coupling for the purposes of sending instructions and commands from processor 102 to the other components. In the illustrated example, the components are coupled to one another via wires or leads that are configured to enable the transmission of signals between the respective components. In other examples, such coupling may be accomplished wirelessly through the use of a short range wireless protocol including, but not limited to, Bluetooth and Wi-Fi.

Angle detection unit 94 may comprise any device that is configured to detect an orientation of aftermarket telematics unit 74 after it has been mounted to windshield 76. This will be referred to herein as the "mounting angle". Such angle detection units are well known in the art. An example of an angle detection unit would be a low G, high precision accelerometer. Angle detection unit 94 may be a stand-alone component or it may be integrated into another component such as a collision detection unit, a satellite navigation chipset, or any suitable component of aftermarket telematics unit 74. Angle detection unit 94 may be connected to any portion of housing assembly 80 including, but not limited to, main portion 81, neck portion 82, and base portion 84.

In some examples, angle detection unit 94 may be configured to detect the mounting angle of aftermarket telematics unit 74 with respect to a horizontal axis of the vehicle 12', a vertical axis of vehicle 12', a longitudinal axis of vehicle 12', a lateral axis of vehicle 12' or with respect to any other predetermined and/or designated reference plane.

Angle detection unit 94 is further configured to electronically generate a message 95 that includes information that is indicative of the mounting angle and still further configured to transmit message 95 to another component with which angle detection unit 94 is coupled. As illustrated in FIG. 4, angle detection unit 94 is coupled with processor 102 via lead 104. Lead 104 may be any component configured to enable the transmission of signals between angle detection unit 94 and a processor 102. Accordingly, angle detection unit 94 is enabled to transmit message 95 to processor 102 and is further configured to receive inquiries and/or instructions from processor 102 via lead 104.

Electronic storage unit 96 is an electronic memory device that is configured to store electronic data files. Electronic storage unit 96 may be any type of data storage component including, without limitation, non-volatile memory, disk drives, tape drives, and mass storage devices and may include any suitable software, algorithms and/or sub-routines that provide the data storage component with the capability to store, organize, and permit the retrieval of data.

In the illustrated example, electronic storage unit 96 is configured to store electronic data file 106. Electronic data file 106 includes information relating to suitable mounting angles for aftermarket telematics unit 74. In some examples, electronic data file 106 may include a plurality of target mounting angles for aftermarket telematics unit 74. In other examples, electronic data file 106 may include two target mounting angles which respectively identify the beginning and the ending of a target range of mounting angles. In other examples, electronic data file 106 may include a single target mounting angle and a predetermined deviation from that single target mounting angle. In still other examples, any other data arrangement that is effective to facilitate the determination of the mounting angle may alternatively be implemented without departing from the teachings of the present disclosure.

The information stored in electronic data file 106 allows electronic data file 106 to be used to determine whether the mounting angle detected by angle detection unit 94 is with a target range. This can be accomplished by comparing the mounting angle with the information contained in electronic data file 106 to determine if the mounting angle either coincides with one of the plurality of target mounting angles or falls within the range of target mounting angles or falls within a predetermined deviation of the single target mounting angle (or by executing some other protocol corresponding with the data arrangement contained within electronic data file 106).

As illustrated, electronic storage unit 96 is coupled with processor 102 via lead 108. Lead 108 permits electronic storage unit 96 to receive inquiries, instructions, and/or commands from processor 102 and further permits electronic storage unit 96 to deliver information, including, but not limited to, the information contained in electronic data file 106, to processor 102.

Wireless communication unit 98 may be any type of wireless communication device including, but not limited to, a transceiver that is configured to communicate via radio frequency transmissions or via any other type of wireless transmission that is effective to communicate a wireless signal. In other examples, rather than utilizing a single wireless communication device, a wireless transmitter and a separate wireless receiver may be used together with aftermarket telematics unit 74 without departing from the teachings of the present disclosure. Wireless communication unit 98 is configured to facilitate communications between aftermarket telematics unit 74 and call center 18.

Wireless communication unit 98 is coupled with processor 102 via lead 110. Lead 110 permits wireless communication unit 98 to receive inquiries, instructions, and/or commands from processor 102 and further permits wireless communication unit 98 to deliver to processor 102 information including, but not limited to, information contained in transmissions received from call-center 18.

Illuminating element 100 may comprise any type of device that is configured to illuminate and/or to present a display to a human user. In some examples, illuminating element 100 may comprise a light bulb, a light emitting diode, and/or a display screen. Illuminating element 100 is mounted to housing assembly 80 in a position where illuminating element 100 will be visible to a human occupant of vehicle 12'. Illuminating element 100 is coupled to processor 102 via lead 112. The 112 permits illuminating element 100 to receive inquiries, instructions, and/or commands from processor 102 and further permits illuminating element 100 to deliver to processor 102 information including, but not limited to, information indicative of whether illuminating element 100 is currently illuminating and/or presenting a display.

Processor 102 may be any type of computer, computer system, microprocessor, collection of logic devices such as field-programmable gate arrays (FPGA), or any other analog or digital circuitry that is configured to calculate, and/or to perform algorithms, and/or to execute software applications, and/or to execute sub-routines, and/or to be loaded with and to execute any type of computer program. In some examples, processor 102 may comprise a single processor while in other examples, processor 102 may comprise more than one processor acting in concert.

Processor 102 is configured to execute various programming designed to enable a user to utilize aftermarket telematics unit 74. For example, processor 102 is configured to perform an initial configuration of aftermarket telematics unit 74 prior to a user's first use of aftermarket telematics unit 74. As stated above, aftermarket telematics unit 74 is configured to provide a variety of telematics services to a user of vehicle 12' and many of these telematics services require interaction with call-center 18. Before a user can use aftermarket telematics unit 74 to receive such telematics services, processor 102 performs the initial configuration procedure which, among other things, registers aftermarket telematics unit 74 with call-center 18. Until the initial configuration procedure has been completed, a user may not avail himself or herself of any of the telematics services described above. The initial configuration procedure is initiated automatically by processor 102 the first time that a user attempts to utilize aftermarket telematics unit 74.

Prior to, or during, the initial configuration procedure, angle detection unit 94 will detect the mounting angle for aftermarket telematics unit 74. In some examples, angle detection unit 94 may be configured to automatically detect the mounting angle of aftermarket telematics unit 74 when aftermarket telematics unit 74 is first connected to an electric power source. In other examples, angle detection unit 94 may be configured to automatically detect the mounting angle when processor 102 performs initial configuration procedure. In still other examples, angle detection unit 94 may be configured to detect the mounting angle of aftermarket telematics unit in response to instruction from processor 102 to detect the mounting angle, either as part of the initial configuration procedure or separate and apart therefrom. Once angle detection unit 94 detects the mounting angle of aftermarket telematics unit 74, angle detection unit 94 transmits message 95 to processor 102. As stated above, message 95 includes information indicative of the mounting angle of aftermarket telematics unit 74.

Processor 102 is configured to receive message 95 from angle detection unit 94. In some examples, processor 102 may receive message 95 from angle detection unit 94 as part of the initial configuration procedure. In such examples, processor 102 will be configured to retrieve the information contained within electronic data file 106 and further configured to compare that information with the information contained message 95 to determine whether the mounting angle of aftermarket telematics unit 74 is within a target range. If so, the initial configuration procedure would proceed. If not, processor 102 is configured to discontinue the initial configuration procedure. In some examples, the discontinuation of the initial configuration procedure would be permanent.

In other examples, processor 102 will receive message 95 prior to performing the initial configuration procedure. In such configurations, processor 102 may be configured to either store the mounting angle and determine if the mounting angle is within the target range at a later time (e.g., during the initial configuration procedure) or processor 102 may be configured to immediately determine whether the mounting angle is within the target range and then store information indicative thereof. In either case, processor 102 is configured to instruct electronic storage unit 96 to create and/or to store information in an electronic data file 114 when processor 102 receives message 95 from angle detection unit 94.

In cases where processor 102 stores the mounting angle and makes further determination later, processor 102 will instruct electronic storage unit 96 to store the mounting angle in electronic data file 114. In such examples, processor 102 is configured to retrieve the information contained in electronic data file 114 and to also the information contained in electronic data file 106 at a later time (e.g., during the initial configuration procedure). At that later time, processor 102 will assess whether the mounting angle of aftermarket telematics unit 74 is within target range using the information that is contained in electronic data file 106 and that is contained in electronic data file 114 and will then either complete or discontinue the initial configuration procedure depending upon the mounting angle.

In cases where processor 102 determines the mounting angle immediately, processor 102 may be configured to retrieve the information contained in electronic data file 106 when processor 102 receives message 95. Once processor 102 has received both the information contained in message 95 and the information contained in electronic data file 106, processor 102 can determine whether the mounting angle is within the target range. In such examples, if processor 102 determines that the mounting angle is outside of the target range, processor 102 is configured to instruct electronic storage unit 96 to store information in electronic data file 114 that indicates that the mounting angle outside of the target range.

This act is known as setting a "flag". Processor 102 is further configured to retrieve electronic data file 114 from electronic storage unit 96 during the initial configuration procedure. If the information contained in electronic data file 114 indicates a signal in response to the mounting angle of aftermarket telematics unit 74 (e.g., that a "flag" has been set), then processor 102 may further be configured to discontinue the initial configuration procedure.

In some examples, in addition to discontinuing the initial configuration procedure, processor 102 may be further configured to transmit an alert to indicate that the initial configuration procedure has not been completed. In some examples, that alert may include information indicating the mounting angle of aftermarket telematics unit 74. In some examples, processor 102 may be configured to transmit an instruction to wireless communication unit 98 that causes wireless communication unit 98 to transmit a message to call-center 18 indicating that the initial configuration procedure was not completed. Such a message may prompt advisor 58 to initiate voice communications with an occupant in vehicle 12'. In other examples, processor 102 may be configured to transmit an instruction to illuminating element 100 to illuminate and/or display a message to the occupant of vehicle 12' regarding the installation or operational status of the device.

Figure 5:
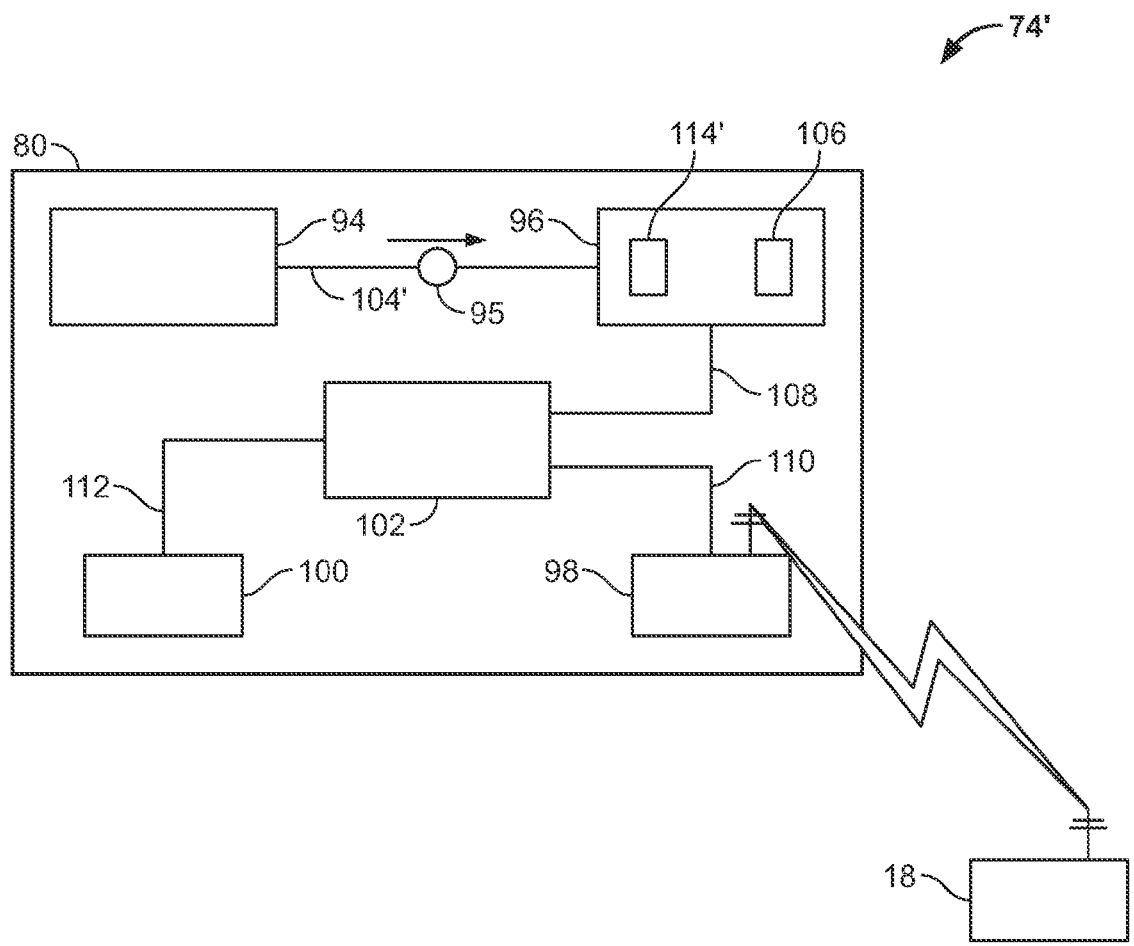
FIG. 5 is a schematic view illustrating an alternate non-limiting example of the aftermarket telematics unit made in accordance with the present disclosure.

FIG. 5 is a schematic view illustrating an alternate example of an aftermarket telematics unit 74'. With continuing reference to FIGS. 1-4, aftermarket telematics unit 74' is substantially identical to aftermarket telematics unit 74 depicted in FIG. 4. For example, aftermarket telematics unit 74' includes angle detection unit 94, electronic storage unit 96, wireless communication unit 98, and illuminating element 100. Furthermore, electronic storage unit 96 is configured to store electronic data file 106 and is coupled with processor 102 via lead 108. Wireless communication unit 98 is coupled with processor 102 via lead 110 and illuminating element 100 is coupled with processor 102 via lead 112.

The primary difference between aftermarket telematics unit 74' and aftermarket telematics unit 74 is that in aftermarket telematics unit 74', angle detection unit 94 is no longer coupled with processor 102 but rather is coupled to electronic storage unit 96 via a lead 104'. In aftermarket telematics unit 74', angle detection unit 94 is configured to automatically detect the mounting angle of aftermarket telematics unit 74' once aftermarket telematics unit 74' has been connected to an electric power source. Once angle detection unit 94 has detected the mounting angle of aftermarket telematics unit 74', angle detection unit 94 is configured to send message 95 to electronic storage unit 96. Angle detection unit 94 is further configured to instruct electronic storage unit 96 to store information indicative of the mounting angle (which is contained in message 95) in an electronic data file 114'.

When processor 102 executes the initial configuration procedure, processor 102 will retrieve electronic data file 106 and electronic data file 114' from electronic storage unit 96. Processor 102 will then utilize the information contained in electronic data file 114' (i.e., information indicative of the mounting angle) and also the information contained in electronic data file 106 (i.e., information indicative of target mounting angles) to ascertain whether the mounting angle of aftermarket telematics unit 74' is within a target range. If processor 102 determines that the mounting angle for aftermarket telematics unit 74' is not within the target range, processor 102 will discontinue initial configuration procedure and, in some examples, may send an alert as described above.

Figure 6:
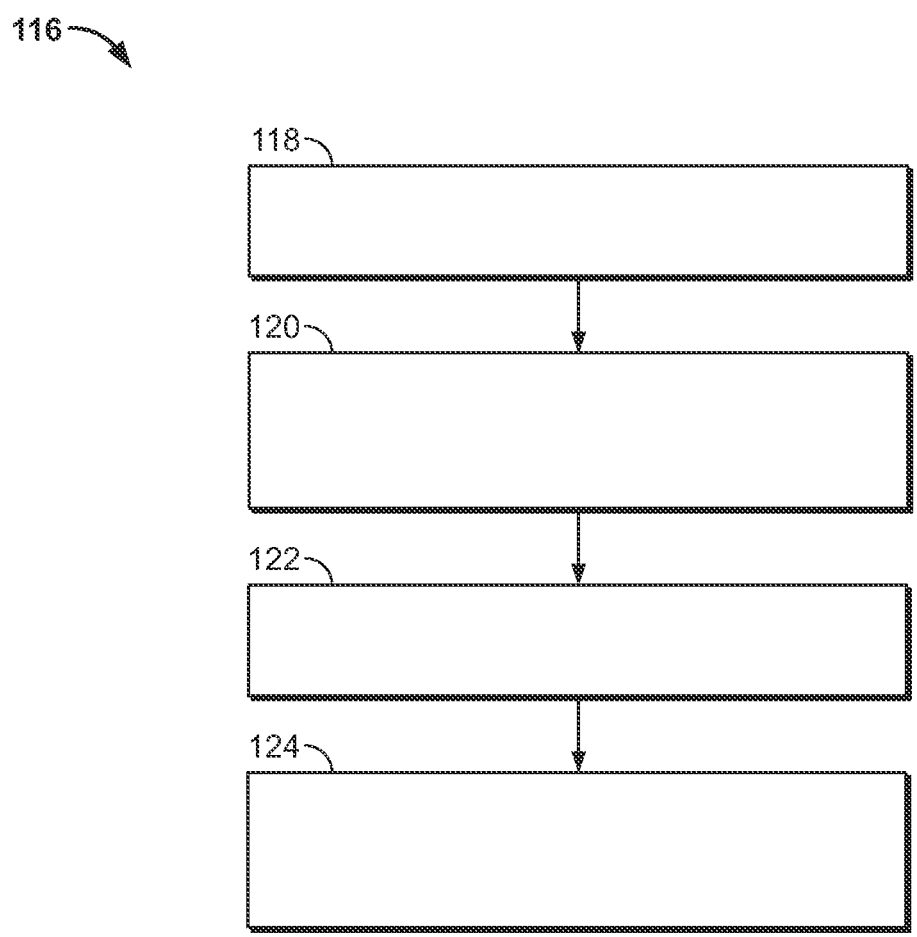
FIG. 6 is a block diagram illustrating a non-limiting example of a method for detecting a mounting angle of an aftermarket telematics unit.

FIG. 6 is a block diagram illustrating a non-limiting example of a method 116 for detecting a target mounting angle of an aftermarket telematics unit.

At block 118, the mounting angle of an aftermarket telematics unit is detected. With continuing reference to FIGS. 1-5, the detection of the aftermarket telematics unit may be accomplished using angle detection unit 94.

At block 120, a processor of the aftermarket telematics unit begins to execute an initial configuration procedure that is necessary to place the aftermarket telematics unit in an operational state.

At block 122, a determination is made regarding whether the mounting angle is within the target range. This determination may be made by the processor during the initial configuration procedure or prior to the initial configuration procedure. Various examples of how this determination can be made have been described above.

At block 124, if it is determined that the mounting angle is not within the target range (e.g., the mounting angle falls outside of the predetermined range or is not included in a list of target mounting angles or deviates from a target mounting angle by more than a predetermined amount, etc . . .), then the initial configuration procedure is discontinued.

In some examples of method 116, additional steps may be included. For example, a user of the aftermarket telematics unit may receive an alert displayed on the aftermarket telematics unit itself. In another example, a call-center that is configured to interact with the aftermarket telematics unit for the purposes of providing telematics services may receive notification from the aftermarket telematics unit of the mounting angle. In such examples, an advisor at a call-center may initiate voice communications with a user of the aftermarket telematics unit and may advise the user.

While at least one example has been presented in the foregoing detailed description, it should be appreciated that a vast number of variations exist. It should also be appreciated that the example or examples described herein are only exemplary, and are not intended to limit the scope, applicability, or configuration in any way. Rather, the foregoing detailed description will provide those skilled in the art with a convenient road map for implementing the example or examples. It should be understood that various changes can be made in the function and arrangement of elements without departing from the scope as set forth in the appended claims and the legal equivalents thereof.

What is claimed is:

1. An aftermarket telematics unit comprising:
    a housing configured to be mounted to an internal surface of a vehicle;
    an electronic storage unit associated with the housing;
    an angle detection unit communicatively coupled with the electronic storage unit, the angle detection unit configured to detect a mounting angle of the housing and to instruct the electronic storage unit to store a first electronic data file containing information indicative of the mounting angle; and
    a processor communicatively coupled with the electronic storage unit,
    wherein the electronic storage unit is configured to store a second electronic data file containing information relating to a plurality of target mounting angles, and wherein the processor is configured to perform an initial configuration procedure, to retrieve the first electronic data file and the second electronic data file stored in the electronic storage unit during the initial configuration procedure, to determine whether the mounting angle is out of a target range using the first electronic data file and the second electronic data file, and to discontinue the initial configuration procedure when the mounting angle is out of the target range, and wherein the second electronic data file contains the plurality of target mounting angles.

2. The aftermarket telematics unit of claim 1, wherein the processor is further configured to transmit an alert when the initial configuration procedure has been discontinued.

3. The aftermarket telematics unit of claim 2, further comprising:
- an illumination element operatively coupled with the processor and configured to illuminate when actuated by the processor,
- wherein the processor is further configured to instruct the illumination element to illuminate when the initial configuration procedure has been discontinued.

4. The aftermarket telematics unit of claim 2, further comprising:
- a wireless communications unit operatively coupled with the processor,
- wherein the processor is further configured to control the wireless communications unit to transmit the alert when the initial configuration procedure has been discontinued.

5. The aftermarket telematics unit of claim 4, wherein the wireless communications unit is configured to facilitate communications between the processor and a call center, and wherein the processor is further configured to control the wireless communications unit to transmit the alert to the call center.

* * * * *